United States Patent [19]

Ikeguchi

[11] 4,396,745

[45] Aug. 2, 1983

[54] CURABLE RESIN COMPOSITION

[75] Inventor: Nobuyuki Ikeguchi, Tokyo, Japan

[73] Assignee: Mitsubishi Gas Chemical Company, Inc., Tokyo, Japan

[21] Appl. No.: 260,983

[22] Filed: May 6, 1981

[30] Foreign Application Priority Data

May 8, 1980 [JP] Japan .................................. 55-61106

[51] Int. Cl.$^3$ ................................................ C08F 8/30
[52] U.S. Cl. .................................... 525/374; 525/375; 525/379; 525/331.3; 525/332.8; 525/332.9; 525/333.1
[58] Field of Search ............... 525/167, 330, 326, 374, 525/332.8, 332.9, 333.1, 331.3, 375, 379

[56] References Cited

U.S. PATENT DOCUMENTS

| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,740,348 | 6/1973 | Grigat et al. | 260/453 AL |
| 3,755,402 | 8/1973 | Grigat et al. | 260/453 AR |
| 4,110,364 | 8/1978 | Gaku et al. | 528/170 |

FOREIGN PATENT DOCUMENTS 51-63149 of 1976 Japan .
1060933 5/1965 United Kingdom .

Primary Examiner—Joseph L. Schofer
Assistant Examiner—Bernard Lipman
Attorney, Agent, or Firm—Fleit, Jacobson & Cohn

[57] ABSTRACT

A curable resin composition comprising a mixture and-/or a preliminary reaction product of (a) at least one cyanate compound selected from the group consisting of polyfunctional cyanate esters, prepolymers of the cyanate esters, coprepolymers of the cyanate esters and an amine and mixtures thereof, (b) at least one rubber, which is liquid at room temperature or elastic, selected from the group consisting of styrene butadiene rubber, isoprene rubber, polychloroprene rubber, butyl rubber, acrylic rubber, natural rubbers, a preliminary reaction product of an epoxy compound and isoprene rubber, a preliminary reaction product of a natural rubber and an epoxy compound, rubbers obtained by introducing acryloyl or methacryloyl group into isoprene, and acid anhydride moiety-containing rubbers obtained by adding double bond of an unsaturated acid anhydride to isoprene and mixtures thereof and optionally (c) at least one compound selected from the group consisting of polyfunctional maleimides, prepolymers of the maleimides or coprepolymers of the maleimides and an amine is disclosed.

9 Claims, No Drawings

CURABLE RESIN COMPOSITION

BACKGROUND OF THE INVENTION

This invention relates to a curable resin composition from which a cured resin having impact chemical resistance, flexural property, heat resistance, mechanical property and moisture resistance can be prepared.

In the prior art, cured compositions having heat resistance, mechanical strength, chemical resistance and moisture resistance can be prepared from a polyfunctional cyanate ester alone or a mixture of a polyfunctional cyanate ester and a polyfunctional maleimide, and optionally epoxy resin. However, such cured resin does not sufficiently have flexural strength and elastic property.

SUMMARY OF THE INVENTION

The present inventor carrier out research for obtaining a cured resin having heat resistance, flexural property and elastic property. As a result, it was found that when a composition comprising a cyanate ester and a rubber which is liquid at room temperature or an elastic rubber is cured, flexural property and elastic property of the resulting cured resin can be improved considerably and heat resistance of the cyanate ester resin itself little deteriorates.

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereinunder referred to as component (a)) and (b) a rubber, which is liquid at room temperature or elastic selected from the group consisting of styrene butadiene rubber, isoprene rubber, polychloroprene rubber, butyl rubber, acrylic rubber, natural rubbers, a preliminary reaction product of an epoxy compound and isoprene rubber, a preliminary reaction product of a natural rubber and an epoxy compound, a rubber obtained by introducing an acryloyl or a methacryloyl group into isoprene, and an acid anhydride moiety-containing rubber obtained by adding double bond of an unsaturated acid anhydride to isoprene (sometimes hereinunder referred to as component (b)) and optionally a polyfunctional maleimide, prepolymer of the maleimide or coprepolymer of the maleimide and an amine (sometimes hereinunder referred to as component (c)).

DETAILED DESCRIPTION OF THE INVENTION

By polyfunctional cyanate ester is meant a compound having at least two cyanate groups in its molecule. The polyfunctional cyanate ester is represented by the formula $$R\text{--}(O\text{--}C\equiv N)_n$$

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^1$ and $R^2$ are the same or different and each represents a hydrogen atom or an alkyl group containing 1 to 4 carbon atoms,

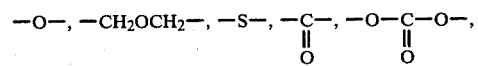

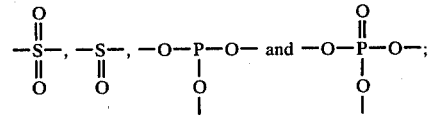

said aromatic nucleus is optionally substituted by a substituent selected from the group consisting of alkyl groups containing 1 to 4 carbon atoms, alkoxy groups, containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 4112/1979 and Japanese Patent Publication (laid open) No. 63149/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'- diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as mixture.

The rubbers, which are liquid at room temperature or elastic, employed in the practice of this invention include styrene butadiene rubber, isoprene rubber, polychloroprene rubber, butyl rubber, acrylic rubber, natural rubbers, preliminary reaction product of an epoxy compound and isoprene rubber, a preliminary reaction product of a natural rubber and an epoxy compound, a rubber obtained by introruding an acryloyl or a methacryloyl group into isoprene, and an acid anhydride moiety-containing rubber obtained by adding double bond of an unsaturated acid anhydride to isoprene. Acrylic rubber is preferable. Styrene butadiene rubber, isoprene rubber, polychloroprene rubber, butyl rubber, acrylic rubber, natural rubbers and a preliminary reaction product of an epoxy compound and isoprene rubber and a preliminary reaction product of a natural rubber and an epoxy compound are known. In addition rubbers containing functional group, such as an acryloyl or a methacryloyl group, or an acid anhydride moiety can be produced by known methods.

By epoxy compound is meant a compound having two or more epoxy groups in its molecule, which is known as a heat curable epoxy resin. By unsaturated acid anhydride is meant a compound having olefinically C—C double bond and acid anhydride moiety.

The polyfunctional maleimides employed in the present invention are organic compounds having two or more maleimide groups derived from maleic anhydride and a polyamine and are represented by the following general formula

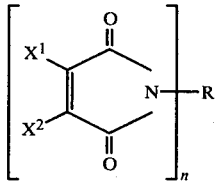

wherein R represents divalent to pentavalent aromatic or alicyclic organic group, each of $X^1$ and $X^2$ represents a hydrogen atom, halogen atom or alkyl group, and n represents an integer of 2-5.

The maleimides represented by the above formula can be produced by a method known per se which involves reacting maleic anhydride with polyamine to form a maleamide acid, and then dehydro-cyclizing the maleamide acid. Examples of polyfunctional maleimide include 1,3- or 1,4-dimaleimide benzene, 1,3- or 1,4-bis(-maleimido methylene)benzene, 1,3- or 1.4-dimaleimido cyclohexane, 1,3- or 1,4-bis(maleimidomethylene)cyclohexane 4,4'-dimaleimido biphenyl, bis(4-maleimidophenyl)methane, bis(4-maleimidophenyl)ether, bis(4-maleimidophenyl)sulfone, bis(4-maleimido-3-methylphenyl)methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, and maleimides derived from melamine and addition product of formalin and an aniline in which benzene rings of two or more aniline bond through methylene group.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The ratio of component (a) and component (c) is not critical. In general, the ratio by weight of component (a) and component (c) may be in the range of from 99:1 to 40:60.

The ratio of component (a) and component (b) is not critical. When preparing heat resistant resin having good adhering property, 1-50% by weight of component (b) and preferably 5-40% by weight of component (b) may be used on the basis of total weight of components (a) and (b) or on the basis of total weight of components (a), (b) and (c) (when component (c) is used). In order to improve heat resistance of cured resin derived from component (b), it is preferable to use 5-50% by weight of component (a) or components (a) and (c) on the basis of total weight of components (a) and (b) or components (a), (b) and (c).

The curable composition of this invention comprises a mixture and/or a preliminary reaction product of component (a) and component (b), and optionally component (c) and optionally other functional group-containing compounds (sometimes hereinunder referred to as component (d)). Component (d) includes, for example (methacrylic esters or prepolymers thereof, such as esters of monofunctional or polyfunctional hydroxy compounds and (meth)acrylic acid, epoxy ester of (meth)acrylic acid, and alkenyl ester of (meth)acrylic acid; polyallyl compounds or prepolymers thereof, such as diallyl phthalate, divinylbenzene, diallylbenzene, and trialkenyl isocyanurate, dicyclopentadiene or prepolymer thereof; epoxy resin; polyimide resin and acid anhydrides such as maleic anhydride and tetrahydrophthalic anhydride. The resin component may be a mixture of components (a) and (b) and optionally (c) and/or (d); a preliminary reaction product of components (a) and (b), components (a), (b) and (c) or components (a), (b), (c)

and (d); a mixture of preliminary reaction product of two or three of components (a), (b), (c) and (d) and the remainder thereof.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methylvorpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octylate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, lexahydropyromellitic anhydride and hexahydrotrimellitic anhydride; azo compounds, such as azoisobutylonitrile, 2,2'-azobispropane, m,m'-azoxystyrene, hydrozones, and mixtures thereof.

In addition to the above-mentioned catalyst, a curing agent for epoxy resin and a curing catalyst for epoxy resin may be used as a catalyst of this invention.

The amount of the catalyst employed may be less than 5% by weight of the total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the nature of the components constituting the composition, and the preliminary reaction conditions. Solid curable composition, liquid curable composition or solution of the composition in solvent may be used according to the use purpose.

The curing conditions of the curable composition of this invention depend on the proportion of components constituting the composition and the nature of the components employed. In general, the composition of this invention may be cured by heating it at a temperature within the range of 90°–300° C., preferably 100°–270° C.

When the curable composition of this invention is used for preparing molding, laminate, adhesive-assembly, press means is preferably applied to the molding, laminate or adhesive-assembly in the heat curing step. In general, these products may be pressed at a pressure of 0.1–500 Kg/cm$^2$.

The composition of this invention cures rapidly, even under mild conditions, so is especially suitable when quantity production and ease of workability are desired. The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

The present invention is further illustrated by the following non-limiting Examples and Controls.

Percent and parts are by weight, unless otherwise specified.

EXAMPLE 1

2,2-Bis(4-cyanatophenyl)propane (600 g) was preliminarily polymerized at 150° C. for 300 minutes, and then to the resulting prepolymer, epoxy resin (EPIKOTE 1001, produced by Shell Chemical Co., Ltd.) (100 g), butyl acrylate-acrylonitrile copolymer (Toa Paint Co., Ltd.) (400 g), bis(4-maleimidophenyl)methane (50 g), bis(4-aminophenyl)methane (2 g) and benzoyl peroxide (0.1 g) as a catalyst were added and were preliminarily reacted at 90° C. for 20 minutes with stirring.

The resulting resin solution was cast in a mold, and cured at 120° C. for 3 hours and for additional 5 hours at 150° C.

Properties of the cast product are shown in Table 1.

Control Test 1

The procedure of Example 1 was repeated except that 2,2-bis(4-cyanatophenyl)propane was used in amount of 1000 g and butyl acrylate-acrylonitrile copolymer was not used. Properties of the resulting cast product are shown in Table 1.

TABLE 1

|  | Ex. 1 | Control Test 1 |
|---|---|---|
| loss in its weight after 50 hours at 180° C. (%) | 0.8 | 0.5 |
| immersion in brake oil at 200° C. for 24 hours | no problem | no problem |
| elongation (%) | 120 | less than 5 |

EXAMPLE 2

1,3-Dicyanatobenzene (800 g) was preliminarily polymerized at 150° C. for 340 minutes, and the resulting prepolymer was dissolved in a mixture of methyl ethyl ketone and N,N-dimethylformamide. To the solution, acrylic rubber (AR-31 produced by Nippon Zeon Co., Ltd.) (200 g) and zinc octylate (0.3 g), triethylenediamine (0.1 g), bis(4-aminophenyl)ether (2 g) and benzoyl peroxide (0.1 g) as a catalyst were added and were mixed uniformly. A glass cloth was impregnated with the mixture and dried with heat to form a B-stage prepreg. Four layers of the prepreg were sandwiched between two fluororesin film, and pressed at 40 Kg/cm$^2$ and 140° C. for 50 minutes, then at 50 Kg/cm² and 165° C. for 100 minutes to produce a laminated sheet.

Insulation resistance of the sheet was $4.0 \times 10^{14}$ ohms (a normal state), and insulation resistance of the sheet was $6.9 \times 10^{11}$ ohms after it was boiled for 2 hours. For comparison, insulation resistance of ethyl acrylate-acrylonitrile copolymer alone was $1.0 \times 10^{14}$ ohms (a normal state), and insulation resistance of the copolymer was $5.7 \times 10^8$ ohms after it was boiled for 2 hours. Insulation resistance of the laminated sheet prepared according to this invention gives superior results to insulation resistance of ethyl acrylate-acrylonitrile copolymer. Glass transition temperature of the sheet was 210° C.

EXAMPLE 3

2,2-Bis(4-cyanatophenyl)propane (450 g) was preliminarily polymerized at 150° C. for 450 minutes. To the resulting prepolymer, liquid chloroprene (Denka LCR CX-050 produced by Denki Kagaku Kogyo Co., Ltd.) (550 g), and wollastonite (200 g) were added and then zinc octylate (0.01 g) and benzoyl peroxide (0.1 g) as a catalyst were added to the mixture, and the resulting mixture was mixed uniformly. The mixture was cast in a mold and cured at 110° C. for 150 minutes and then 4 hours at 150° C. Property of the cast product are shown in Table 2.

TABLE 2

| | | Ex. 3 |
|---|---|---|
| chemical resistance | 1,1,1-trichloro-ethane methylene chloride | no problem |
| elongation (%) | | 170 |

EXAMPLE 4

1,4-Dicyanatobenzene (900 g) and bis(4-maleimidophenyl)methane (100 g) were preliminarily reacted at 150° C. for 100 minutes. The resulting prepolymer was dissolved in a mixture of N,N-dimethylformamide and methyl ethyl ketone. To the solution, epoxy resin (EPIKOTE 1001 produced by Shell Chemical Co., Ltd.) (200 g), polychloroprene (produced by Showa Neoprene Co., Ltd.) (200 g) were added and then azobisisobutylonitrile (0.1 g) and zinc octylate (0.5 g) as a catalyst were added, and the mixture was mixed uniformly.

A coating of the resulting blend was applied to two epoxy resin test panels (125 mm long, 25 mm wide, 0.4 mm thick) and dried with heat to B-stage. The test panels were joined so that the surfaces dried to B-stage contacted each other to provide a 10 mm long overlap along the longitudinal edge, and the joined panels were heat-cured at 100° C. for 5 hours and for additional 3 hours at 140° C. The overlapped portion of the panels was 2.0 mm thick and had a shear bond strength of 87.5 Kg/cm², and glass transition temperature of 220° C.

EXAMPLE 5

2,2-Bis(4-cyanatophenyl)propane (50 g) was preliminarily polymerized at 150° C. for 400 minutes. The resulting prepolymer and styrene-butadiene copolymer (average molecular weight of 2100 and styrene content of 13% by weight) (200 g) were mixed uniformly at 80° C. and then to the mixture, zinc octylate (0.01 g) and benzoyl peroxide (0.1 g) as a catalyst were added and the mixture was mixed uniformly.

The resulting resin composition was cast in a mold and cured for 120 minutes at 150° C. and for additional 60 minutes at 175° C. to obtain cast product. The cast product had elongation of 250%. It little deteriorated even after it was maintained at 150° C. for 100 hours.

EXAMPLE 6

The catalyst-containing resin (250 g) of Example 5 and wollastonite (100 g) were mixed uniformly. The resulting composition was cast and cured in the same way as in Example 5. The cast product had elongation of 210%.

EXAMPLE 7

1,4-Dicyanatobenzene (900 g) and bis(4-maleimidophenyl) methane (100 g) were preliminarily reacted at 150° C. for 100 minutes. The resulting prepolymer was cooled to 100° C., and then to the prepolymer, epoxy resin (EPIKOTE 1001 produced by Shell Chemical Co., Ltd.) (200 g), styrene-butadiene copolymer (Nipol 1006, produced by Nippon Zeon Co., Ltd.) (100 g), and azobisbutylonitrile (0.1 g) and zinc octylate (0.5 g) as a catalyst were added and mixed uniformly.

A coating of the resulting blend was applied to two epoxy resin test panels (125 mm long, 25 mm wide, 0.4 mm thick) and dried with heat to B-stage. The test panels were joined so that the surfaces dried to B-stage contacted each other to provide a 10 mm wide overlap along the longitudinal edge, and the joined panels were heat-cured at 110° C. for 300 minutes and for additional 180 minutes at 160° C. The overlapped portion of the panels was 2.0 mm thick and had a shear bond strength of 80.0 Kg/cm², and glass transition temperature of 237° C.

PREPARATION 1

2,2-Bis(4-cyanatophenyl)propane (850 g) and bis(4-maleimidophenyl)methane (150 g) were preliminarily reacted at 145° C. for 150 minutes. The resulting resin composition is referred to as composition A.

2,2-Bis(4-cyanatophenyl)propane (1000 g) was preliminarily polymerized at 150° C. for 5 hours. The resulting resin composition is referred to as composition B.

Carboxyl-containing isoprene rubber (LIR-410 produced by Kuraray Isoprene Chemical Co., Ltd.: molecular weight of 30,000 and average carboxy groups of 9.8 in its molecule) (200 g) was dissolved in methyl ethyl ketone (200 g), and was preliminarily polymerized at 80° C. for 2 hours with refluxing. The resulting resin composition is referred to as composition C.

EXAMPLES 8-14 AND CONTROL TESTS 2-3

Compositions A, B and C, isoprene rubber not having carboxy group (LIR-30; molecular weight of 29,000, produced by Kuraray Isoprene Chemical Co., Ltd.) and natural rubber (molecular weight of 950,000) were employed as shown in Table 3 and each component was dissolved in methyl ethyl ketone. A glass cloth was impregnated with each solution to obtain prepreg of B-stage.

One sheet of the prepreg was sandwiched between electrolytic copper foils 35μ thick and pressed at 175° C. and 30 Kg/cm² for 120 minutes. Properties of the resulting copper-clad sheet are shown in Table 4.

TABLE 3

| component (wt %) | | Ex. 8 | Ex. 9 | Ex. 10 | Ex. 11 | Ex. 12 | Ex. 13 | Ex. 14 | Cont. 2 | Cont. 3 |
|---|---|---|---|---|---|---|---|---|---|---|
| composition | A | 95 | 95 | 0 | 80 | 65 | 50 | 10 | 0 | 0 |
| | B | 0 | 0 | 80 | 0 | 0 | 0 | 0 | 100 | 0 |
| | C (sold content) | 3 | 0 | 20 | 20 | 35 | 50 | 90 | 0 | 100 |
| | isoprene rubber LIR-30 | 0 | 5 | 0 | 0 | 0 | 0 | 0 | 0 | 0 |
| | natural rubber | 2 | 0 | 0 | 0 | 0 | 0 | 0 | 0 | 0 |
| catalyst | zinc octylate | 0.01 | 0.01 | 0.01 | 0 | 0 | 0 | 0 | 0.04 | 0 |
| | trichlene diamine | 0 | 0 | 0 | 0 | 0 | 0 | 0 | 0.04 | 0 |

TABLE 4

| | | Ex. 8 | Ex. 9 | Ex. 10 | Ex. 11 | Ex. 12 | Ex. 13 | Ex. 14 | Cont. 2 | Cont. 3 |
|---|---|---|---|---|---|---|---|---|---|---|
| Peel strength of copper foil (Kg/cm) | A | 1.84 | 1.65 | 1.60 | 1.42 | 1.48 | 1.35 | 1.84 | 1.77 | 0.22 |
| | $S_4$ | 1.70 | 1.40 | 1.50 | 1.38 | 1.56 | 1.27 | 1.39 | 1.66 | 0.12 |
| Hot solder resistance at 300° C. float (sec) | | 20< | 20< | 20< | 20< | 20< | 20< | 20< | 20< | |
| pressure cooker (120° C. 2 atm 20 hrs.) | | | | | no change | | | | changed slightly | changed greatly |
| flexural strength (1 mm φ wound) | | | | | good | | | | broken | good |
| chemical resistance (immersion for 5 min.) | trichloroethane | | | | no change | | | | | changed greatly |
| | methyl ethyl ketone | | | | no change | | | | | changed greatly |

EXAMPLE 15

2,2-Bis(4-cyanatophenyl)propane (900 g) and bis(4-maleimidophenyl)methane (100 g) were preliminarily reacted at 150° C. for 150 minutes to obtain prepolymer. To the prepolymer, epoxy resin (EPIKOTE 828, produced by Shell Chemical Co., Ltd.) (200 g), bromobutyl rubber (800 g) and zinc octylate (0.5 g) as a catalyst were added. The mixture was blended uniformly by using roll. The mixture was charged in a mold, and heated at 100° C. for 130 minutes and cured at 120° C. for 170 minutes to obtain molding. The properties of the molding are shown in Table 5.

CONTROL TEST 4

The procedure of Example 15 was repeated except that bromobutyl rubber is not used. The properties of the molding are shown in Table 5.

TABLE 5

| | | Ex. 15 | Cont. 4 |
|---|---|---|---|
| elongation (%) | | 25 | less than 3 |
| moisture resistance (120° C., 2 atms, 30 hrs in steam) | | no change | changed slightly |
| chemical resistance (immersion for 10 hrs) | 1,1,1-trichloroethane | no change | no change |
| | dichloromethane | no change | changed slightly |
| | 10% HCl | no change | no change |

EXAMPLE 16

1,4-Dicyanatobenzene (750 g) and bis(4-maleimidophenyl) ether (150 g) were preliminarily reacted at 150° C. for 150 minutes to obtain prepolymer. The prepolymer was dissolved in a mixture of N,N-dimethylformamide and methyl ethyl ketone. To the solution, butyl rubber (100 g) and zinc octylate (0.5 g), triethylenediamine (0.4 g) and ditert.-butyl peroxide (0.2 g) as a catalyst were added and the mixture was mixed uniformly to obtain a varnish. The vanish was impregnated in a glass cloth and dried to obtain prepreg of B-stage. The six layers of the prepreg were sandwiched between electrolytic copper foils 35µ thick and pressed at 35 Kg/cm² and 175° C. for 120 minutes to obtain copper-clad laminate sheet. Properties of the sheet are shown in Table 6.

CONTROL TEST 5

The procedure of Example 16 was repeated except that butyl rubber was not used. Properties of the resulting copper-clad sheet are shown in Table 6.

TABLE 6

| | | Ex. 16 | Control Test 5 |
|---|---|---|---|
| Peel strength of copper foil (Kg/cm) | | 2.0 | 1.6 |
| moisture resistance (120° C., 2 atms, for 40 hrs and in steam) | | no change | changed slightly |
| Hot solder resistance (260° C. float for 2 min.) | | no change | no change |
| glass transition temperature (°C.) | | 254 | 240 |
| chemical resistance (immersion for 24 hrs.) | 1,1,1-trichloroethane | no change | no change |
| | dichloroethane | no change | changed slightly |

TABLE 6-continued

|  | Ex. 16 | Control Test 5 |
| --- | --- | --- |
| 10% HCl | no change | no change |
| n-propyl alcohol | no change | no change |

What is claimed is:

1. A curable resin composition comprising:
   (a) at least one cyanate ester compound selected from the group consisting of:
   (1) a polyfunctional aromatic cyanate ester monomer having the formula:

wherein m is 2 to 5 and R is an aromatic organic group, the cyanate groups being bonded to an aromatic ring of said aromatic organic group,
   (2) a prepolymer of (1), and
   (3) a coprepolymer of (1) and an amine; and
   (b) at least one rubber, which is liquid at room temperature or elastic, selected from the group consisting of styrene butadiene rubber, isoprene rubber, polychloroprene rubber, butyl rubber, acrylic rubber, natural rubbers, preliminary reaction products of an epoxy compound and isoprene rubber, preliminary reaction products of a natural rubber and an epoxy compound, rubbers obtained by introducing an acryloyl or a methacryloyl group into isoprene, and acid anhydride moiety-containing rubber obtained by adding a double bond of an unsaturated acid anhydride to isoprene and mixtures thereof; said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanophenyl)propane; 2,2-bis(3,5-dibromo-4-dicyanatophenyl)propane; bis(4-cyanatophenyl) ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

3. The composition as defined in claim 1 wherein component (b) is acrylic rubber.

4. The composition as defined in claim 1 wherein component (b) is used in an amount of 1–95% by weight on the basis of total weight of components (a) and (b).

5. A curable resin composition comprising:
   (a) at least one cyanate ester compound selected from the group consisting of:
   (1) a polyfunctional aromatic cyanate ester monomer having the formula:

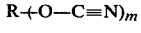

wherein m is 2 to 5 and R is an aromatic organic group, the cyanate groups being bonded to an aromatic ring of said aromatic organic group,
   (2) a prepolymer of (1), and
   (3) a coprepolymer of (1) and an amine;
   (b) at least one rubber, which is liquid at room temperature or elastic, selected from the group consisting of styrene butadiene rubber, isoprene rubber, polychloroprene rubber, butyl rubber, acrylic rubber, natural rubbers, preliminary reaction products of an epoxy compound and isoprene rubber, preliminary reaction products of a natural rubber and an epoxy compound, rubbers obtained by introducing an acryloyl or a methacryloyl group into isoprene, and acid anhydride moiety-containing rubber obtained by adding a double bond of an unsaturated acid anhydride to isoprene and mixtures thereof,
   (c) at least one compound selected from the group consisting of:
   (1) a polyfunctional maleimide,
   (2) a prepolymer of (1), and
   (3) a coprepolymer of (1) and an amine,
   said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b).

6. The composition as defined in claim 5 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl) ether; bis(4-cyanatophenyl)thioether; bis(4-cyanatophenyl) sulfone; tris(4-cyanatophenyl)phosphite; tris(4-cyanatophenyl) phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

7. The composition as defined in claim 5 wherein component (b) is acrylic rubber.

8. The composition as defined in claim 5 wherein the polyfunctional maleimide is selected from the group consisting of 1,3- or 1,4-dimaleimide benzene, 1,3- or 1,4-bis(maleimide methylene)benzene, 1,3- or 1,4-dimaleimide cyclohexane, 1,3- or 1,4-bis(maleimide methylene)cyclohexane, 4,4'-dimaleimide biphenyl, bis(4-maleimidephenyl)methane, bis(4-maleimidephenyl) ether, bis(4-maleimidephenyl)sulfone, bis(4-maleimide-3-methylphenyl)methane, bis(4-maleimide-3-chlorophenyl)methane, bis(4-maleimide-3,5-dimethylphenyl)methane, 2,2-bis(4-maleimide-3-methylphenyl)propane, 2,2-bis(4-maleimide-3,5-dibromophenyl)propane, bis(4-maleimidephenyl)phenylmethane, 3,4-dimaleimidephenyl-4'-maleimidephenylmethane, 1,1-bis(4-maleimidephenyl)-1-phenylmethane, and maleimide derived from melamine and, addition product of formalin and an aniline in which benzene rings of two or more aniline bond through methylene group.

9. The composition as defined in claim 5 wherein component (b) is used in an amount of 1–95% by weight on the basis of total weight of components (a), (b) and (c).

* * * * *

UNITED STATES PATENT AND TRADEMARK OFFICE
CERTIFICATE OF CORRECTION

PATENT NO. : 4,396,745
DATED : August 2, 1983
INVENTOR(S) : Nobuyuki IKEGUCHI

It is certified that error appears in the above-identified patent and that said Letters Patent are hereby corrected as shown below:

On the title page add:
[30]  Foreign Application Priority Data

| May 8, 1980 | [JP] | Japan | 55-61106 |
| May 8, 1980 | [JP] | Japan | 55-61107 |
| May 8, 1980 | [JP] | Japan | 55-61108 |
| January 22, 1981 | [JP] | Japan | 56-8346 |
| April 3, 1981 | [JP] | Japan | 56-50179 |

Signed and Sealed this

First Day of May 1984

[SEAL]

Attest:

GERALD J. MOSSINGHOFF

Attesting Officer

Commissioner of Patents and Trademarks